United States Patent
Mann

(10) Patent No.: US 8,408,627 B2
(45) Date of Patent: Apr. 2, 2013

(54) PICK UP TRUCK, RAIL CAP ASSEMBLY WITH LIGHTING SYSTEM AND METHOD OF USE

(75) Inventor: Jasdeep K. Mann, Farmington Hills, MI (US)

(73) Assignee: 3M Innovative Properties Company, St. Paul, MN (US)

( * ) Notice: Subject to any disclaimer, the term of this patent is extended or adjusted under 35 U.S.C. 154(b) by 366 days.

(21) Appl. No.: 12/637,909

(22) Filed: Dec. 15, 2009

(65) Prior Publication Data
US 2011/0140605 A1   Jun. 16, 2011

(51) Int. Cl.
*B60R 13/04* (2006.01)

(52) U.S. Cl. ......... 296/39.2; 280/770; 315/77; 362/485; 296/41

(58) Field of Classification Search ............ 296/39.2, 296/41; 362/485, 505; 293/128; 280/770; 315/77
See application file for complete search history.

(56) References Cited

U.S. PATENT DOCUMENTS

| | | | |
|---|---|---|---|
| 4,253,785 A | | 3/1981 | Bronstein |
| 4,818,006 A | * | 4/1989 | Arndt ............... 296/32 |
| 4,909,559 A | | 3/1990 | Zettle |
| 5,584,521 A | | 12/1996 | Hathaway et al. |
| 5,704,678 A | * | 1/1998 | Elwell et al. ........ 296/39.2 |
| 5,795,051 A | | 8/1998 | Galanski |
| 5,823,601 A | | 10/1998 | Stanesic et al. |
| 5,844,367 A | | 12/1998 | Agans, Jr. |
| 6,000,821 A | | 12/1999 | Beliakoff |
| 6,116,761 A | | 9/2000 | Munsey |
| 6,238,068 B1 | * | 5/2001 | Farmer, Jr. ............ 362/485 |
| 6,238,153 B1 | | 5/2001 | Karrer |
| 6,260,990 B1 | | 7/2001 | Saunders |
| 6,286,884 B1 | | 9/2001 | Speece |
| 6,461,028 B1 | * | 10/2002 | Huang .............. 362/505 |
| 6,783,267 B1 | | 8/2004 | Yeoman et al. |
| 6,927,540 B1 | | 8/2005 | Zich |
| 7,088,045 B1 | | 8/2006 | Zieh |
| 7,278,904 B2 | | 10/2007 | Woo et al. |
| 7,303,315 B2 | | 12/2007 | Ouderkirk et al. |

(Continued)

FOREIGN PATENT DOCUMENTS

WO   WO 2009086032 A1   7/2009
WO   WO 2010/080458 A1   7/2010
WO   WO 2011/038090 A1   3/2011

OTHER PUBLICATIONS

Product Literature, "3M Truck Bed Lighting Kit—Deluxe", Jul. 2009, 4 pages, 3M Company, Saint Paul, Minnesota.

(Continued)

*Primary Examiner* — Glenn Dayoan
*Assistant Examiner* — Pinel Romain
(74) *Attorney, Agent, or Firm* — Bradford B. Wright

(57) ABSTRACT

A rail cap assembly comprises a rail cap having a first and second opposed ends separated by a length, wherein the rail cap has a top and first and second sidewalls that together form an inner surface extending from the first end to the second end. Openings are spaced along the length of the rail cap. A lighting system is at least partially disposed within the inner surface and comprising a plurality of lighting elements. Each lighting element is secured within a respective opening. The lighting elements are electrically interconnected through connective wiring. The rail cap assembly may be installed one at least one bedrail of a pickup truck.

23 Claims, 3 Drawing Sheets

U.S. PATENT DOCUMENTS

| | | | |
|---|---|---|---|
| 7,309,256 B2 | 12/2007 | Alloway et al. | |
| 7,380,410 B2* | 6/2008 | Rand et al. | 62/302 |
| 7,401,949 B2* | 7/2008 | Tufte | 362/369 |
| 2007/0008732 A1* | 1/2007 | Robertson et al. | 362/459 |
| 2008/0074871 A1 | 3/2008 | Meis et al. | |
| 2010/0207139 A1* | 8/2010 | Winkler et al. | 257/98 |

OTHER PUBLICATIONS

Product Literature, "3M Truck Bed Lighting", 2009 (prior to Dec. 15, 2009), 2 pages, 3M Company, Saint Paul, Minnesota.

Product Literature, 3M Light-by-wire (LBW), Feb. 2007, 2 pages, 3M Company, Saint Paul, Minnesota.

Product Literature, "Putco LED Cargo Light Kits", © 2008, one page, downloaded from http://www.putcosales.com/Putco-LED-Cargo-Light-Kits-PRD46.aspx on Apr. 13, 2010.

Product Literature, "Recon Accessories: Part #26417—Universal Cargo Area Bed Rail Light Kit", © 2007, 2 pages, Recon Unique Truck Lighting Components, Sunrise, Florida, downloaded from http://www.gorecon.com/product.php?pk=90 on Apr. 13, 2010.

* cited by examiner

PICK UP TRUCK, RAIL CAP ASSEMBLY WITH LIGHTING SYSTEM AND METHOD OF USE

TECHNICAL FIELD

The present specification broadly relates to lighting systems suitable for use with motor vehicles.

BACKGROUND

Various lighting systems for use with pickup truck cargo beds are known. A number of such systems require substantial modification (e.g., drilling and/or punching) of the bedrails and sufficiently tedious installation that these lighting systems are only available as aftermarket accessories.

SUMMARY

In one aspect, the present disclosure provides a pickup truck having bedrails adjacent a cargo bay, wherein at least one of the bedrails has a rail cap assembly secured thereon, wherein the rail cap assembly comprises:

a rail cap having a first and second opposed ends separated by a length, wherein the rail cap has a top and a first sidewall that together form an inner surface extending from the first end to the second end, and wherein a plurality of openings are spaced along the length of the first sidewall;

a lighting system at least partially disposed adjacent the inner surface and comprising a plurality of lighting elements, wherein each of the plurality of lighting elements is secured within a respective opening of the plurality of openings, and wherein the plurality of lighting elements are electrically interconnected through connective wiring.

In some embodiments, the rail cap assembly further comprises an electrical switch, wherein the plurality of lighting elements is electrically connected through the connective wiring to the electrical switch, and wherein the electrical switch is adapted to regulate electrical power to the plurality of lighting elements. In some embodiments, the pickup truck has a battery, and wherein the electrical switch is electrically connected to a positive terminal of the battery by a fused circuit. In some embodiments, the pickup truck further comprises double-sided pressure-sensitive adhesive tape disposed between the rail cap assembly and the bedrail.

In some embodiments, the rail cap further comprises a second sidewall adjacent the top, wherein a channel is formed by the first and second sidewalls and the top. In some of those embodiments, the first sidewall has an extended portion that is disposed further from the top than the second sidewall.

In some embodiments, the first sidewall has at least one groove disposed therein and contiguous with the inner surface, wherein at least a portion of the connective wiring is disposed within the at least one groove.

In another aspect, the present disclosure provides a rail cap assembly comprising:

a rail cap having a first and second opposed ends separated by a length, wherein the rail cap has a top and a first sidewall that together form an inner surface extending from the first end to the second end, and wherein a plurality of openings are spaced along the length of the first sidewall;

a lighting system at least partially disposed adjacent the inner surface and comprising a plurality of lighting elements, wherein each of the plurality of lighting elements is secured within a respective opening of the plurality of openings, and wherein the plurality of lighting elements are electrically interconnected through connective wiring.

In some embodiments, the rail cap assembly further comprises an electrical switch, wherein the plurality of lighting elements is electrically connected through the connective wiring to the electrical switch, and wherein the electrical switch is adapted to regulate electrical power to the plurality of lighting elements. In some of embodiments, the electrical switch is disposed within one opening of the plurality of openings. In some embodiments, the electrical switch comprises a capacitance switch.

In some embodiments, the plurality of lighting elements comprises light emitting diodes. In some embodiments, the connective wiring comprises a ribbon cable. In some embodiments, the rail cap is an integral body. In some embodiments, the rail cap assembly further comprises foam disposed adjacent the inner surface. In some embodiments, the rail cap assembly further comprises double-sided pressure-sensitive adhesive tape disposed adjacent the inner surface. In some embodiments, the rail cap further comprises a second sidewall adjacent the top, wherein a channel is formed by the first and second sidewalls and the top. In some embodiments, the first sidewall has an extended portion that is disposed further from the top than the second sidewall. In some embodiments, the first sidewall has at least one groove disposed therein and contiguous with the inner surface, wherein at least a portion of the connective wiring is disposed within the at least one groove.

In yet another aspect, the present disclosure provides a method of using a rail cap assembly, the method comprising:

disposing at least one rail cap assembly according to the present disclosure onto at least one respective bedrail of a motor vehicle.

In some embodiments, the method comprises disposing two of the rail cap assemblies onto two respective bedrails of a motor vehicle. In some embodiments, the motor vehicle comprises a pickup truck. In some embodiments, the rail cap assembly further comprises an electrical switch, wherein the plurality of lighting elements is electrically connected through the connective wiring to the electrical switch, wherein the electrical switch is adapted to regulate electrical power to the plurality of lighting elements, and wherein the method further comprises electrically connecting the electrical switch to the positive terminal of a motor vehicle battery by a fused circuit. In some embodiments, the rail cap assembly further comprises an electrical switch, wherein the plurality of lighting elements is electrically connected through the connective wiring to the electrical switch, wherein the electrical switch is adapted to regulate electrical power to the plurality of lighting elements, and wherein the method further comprises electrically connecting the electrical switch to a tail light harness of a motor vehicle.

Advantageously, rail cap assemblies according to the present disclosure can be fabricated with substantially the same profile as existing rail caps. In some embodiments, rail cap assemblies according to the present disclosure can be readily fabricated from existing rail caps. Since most rail caps are made from thermoplastic polymers and are manufactured using a molding process, the present disclosure eliminates the necessity for preparing costly new molds for each rail cap size.

Importantly, rail cap assemblies according to the present disclosure are simple enough to install that they are suitable for inclusion in original equipment manufacturer (OEM) vehicle assembly lines.

The features and advantages of the present disclosure will be understood upon consideration of the detailed description of the preferred embodiment as well as the appended claims. These and other features and advantages of the disclosure may be described below in connection with various illustrative embodiments of the invention. The above summary is not intended to describe each disclosed embodiment or every implementation of the present invention. The Figures and the detailed description which follow more particularly exemplify illustrative embodiments.

While the above-identified drawing figures set forth several embodiments of the present disclosure, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale. Like reference numbers may have been used throughout the figures to denote like parts.

DETAILED DESCRIPTION

Figure 1:
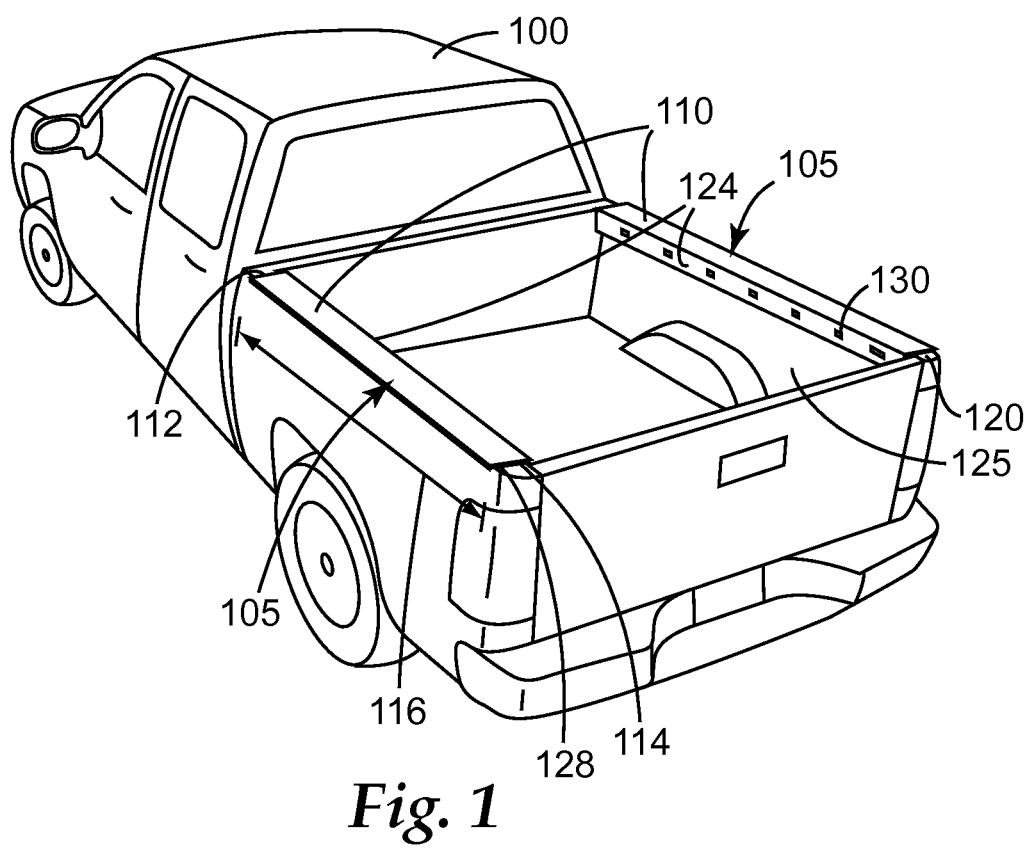
FIG. 1 is a perspective view of a pickup truck having two installed exemplary rail cap assemblies according to the present disclosure.

FIG. 1 shows exemplary rail cap assemblies 105 installed onto bedrails 120 adjacent cargo bay 125 of pickup truck 100. Each rail cap assembly 105 comprises a rail cap 110 having first and second respective opposed ends (112, 114) separated by a length 116. Each rail cap assembly 105 has a top 122 and first sidewall 124 that together form inner surface 128 extending from first end 112 to second end 114. A plurality of openings 130 are spaced along length 116 of first sidewall 124.

In some embodiments, the rail cap assembly further includes a second sidewall opposite the first sidewall, such that the rail cap assembly fits over the bedrail and down along the top portion of a bedrail.

Figure 2:
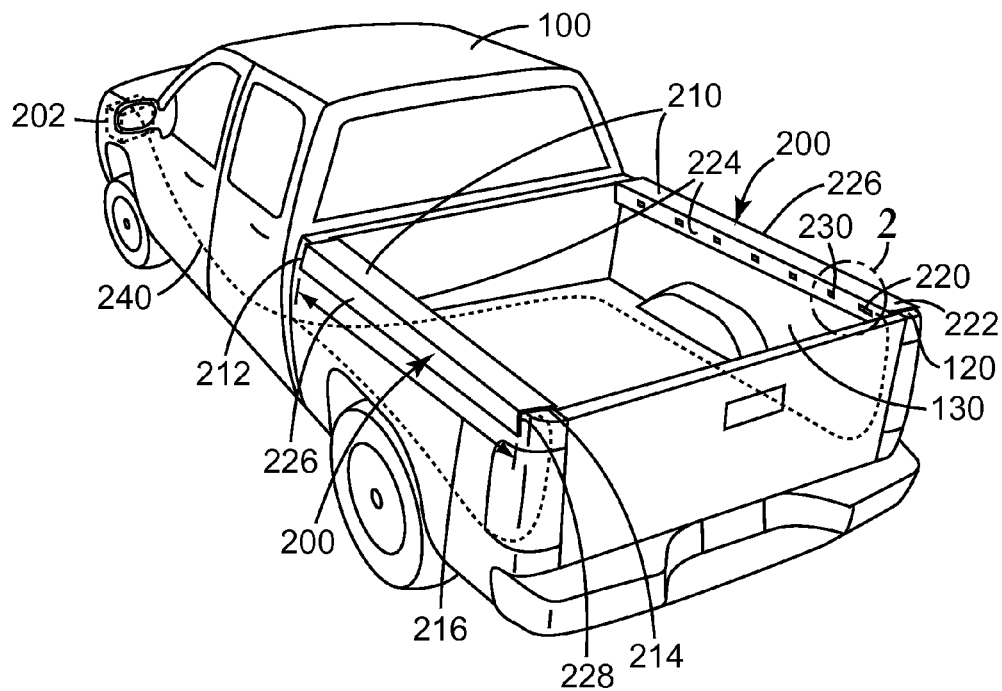
FIG. 2 is a perspective view of a pickup truck having two installed exemplary rail cap assemblies according to the present disclosure.

FIG. 2 shows exemplary rail cap assemblies 200 installed onto bedrails 120 adjacent cargo bay 125 of pickup truck 100. Each rail cap assembly 200 comprises a rail cap 210 having first and second respective opposed ends (212, 214) separated by a length 216. Each rail cap assembly 200 has a top 222 and first and second respective sidewalls (224, 226) that together form inner surface 228 extending from first end 212 to second end 214. A plurality of openings 230 are spaced along the length 216 of first sidewall 224.

Figure 3:
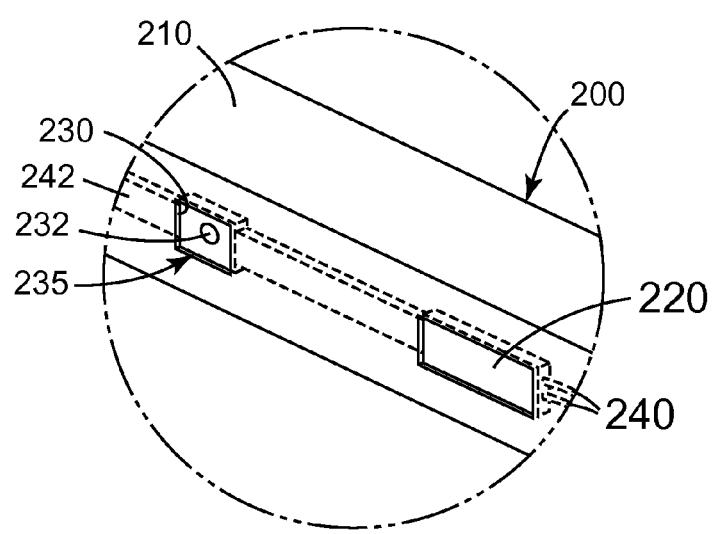
FIG. 3 is an enlarged view of the inset portion 2 of one exemplary rail cap assembly shown in FIG. 2.

Referring now to FIG. 3, lighting system 235 comprises a plurality of lighting elements 232, each of the plurality of lighting elements 232 being secured within a respective opening 230. The plurality of lighting elements 232 are electrically interconnected through connective wiring 242. Optional electrical switch 220, which is electrically connected to the plurality of lighting elements 232 through connective wiring 242, regulates electrical power to the plurality of lighting elements 232. As shown, electrical switch 220 is disposed within one of the openings 230.

As shown in FIGS. 2 and 3, lighting system 235 is electrically connected to the positive terminal of battery 202 via a fused circuit 240 (i.e., having an electrical fuse element therein, but without additional switches other than the electrical switch of the lighting system itself). This allows the lighting system to be operated without the necessity of placing a key the ignition switch.

Alternatively, the lighting system may be electrically connected to a tail light harness. In such a case, it would typically be necessary for the key to be in the ignition and in the accessories position for electrical power to be supplied to the lighting system.

The rail cap may be a composite of several component parts (e.g., as attached one to another by mechanical fasteners and/or adhesive), but more typically the rail cap is an integral body. For example, the rail cap may be formed from bent metal (e.g., chromed sheet metal), or a molded organic polymer (e.g., polyurethane, high density polypropylene, or polyamide), which may be thermoplastic or thermoset.

Figure 4:
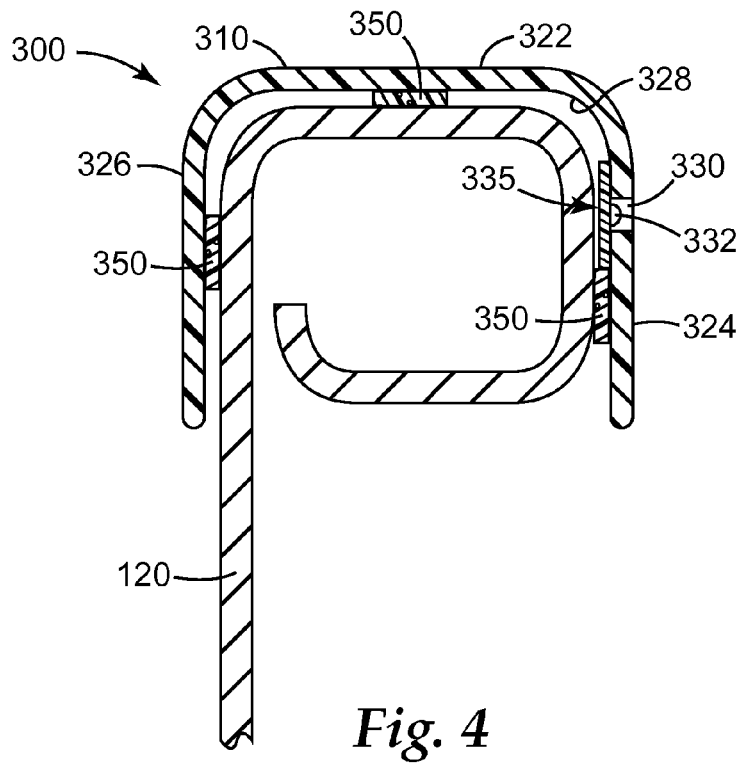
FIG. 4 is a cross-sectional view of a bedrail having an exemplary rail cap assembly according to the present disclosure installed thereon.

In one embodiment, shown in FIG. 4, the rail cap 310 has respective opposed sidewalls 324, 326 of substantially equal dimensions and a top 322 that together with sidewalls 324 and 326 form inner surface 328 that runs the length of rail cap 310. In use, rail cap assembly 300 is affixed to bedrail 120 by optional double-sided pressure-sensitive adhesive tape 350 disposed within inner surface 328. In this embodiment, lighting elements 332 are disposed in openings 330 in rail cap 310, while remaining components of the lighting system 335 is disposed between the rail cap and the bedrail. The lighting system may be held in place by adhesive, interference fit, and/or mechanical fastener.

Figure 5:
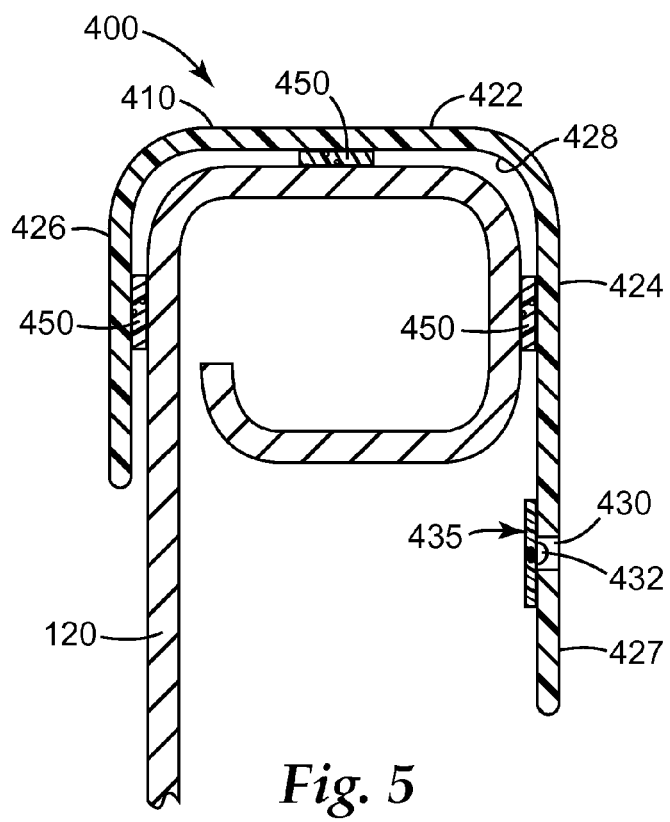
FIG. 5 is a cross-sectional view of a bedrail having another exemplary rail cap assembly according to the present disclosure installed thereon.

In another embodiment, shown in FIG. 5, the rail cap 410 has respective opposed sidewalls 424, 426. Sidewall 424 has an extended portion 427 disposed further from top 422 than the distal portion of second sidewall 426. Together with sidewalls 424 and 426, top 422 forms inner surface 428 that runs the length of rail cap 410. In use, rail cap assembly 400 is affixed to bedrail 120 by optional double-sided pressure-sensitive adhesive tape 450 disposed within inner surface 428. In this embodiment, lighting elements 432 are disposed in openings 430 in rail cap 410, while remaining components of the lighting system 435 are disposed on the extended portion 427 adjacent the inner surface 428. The lighting system may be held in place by adhesive, interference fit, and/or mechanical fastener.

The double-sided pressure-sensitive adhesive tape may, for example, have a dense core or a foam core. Foam cores typically provide a higher degree of impact cushioning. Exemplary double-sided pressure-sensitive adhesive tapes include those available as 3M VHB Tape from 3M Company of Saint Paul, Minn. While double-sided pressure-sensitive adhesive tape is shown in FIGS. 4 and 5 it will be recognized that other types of foams such as, for example, polyurethane foams and non-adhesive foams may also be used. Pressure-sensitive foam and non-adhesive foam are often desirable because it may be possible to preserve the original paint in case later removal of the rail cap assembly from the bedrail is desired.

Figure 6:
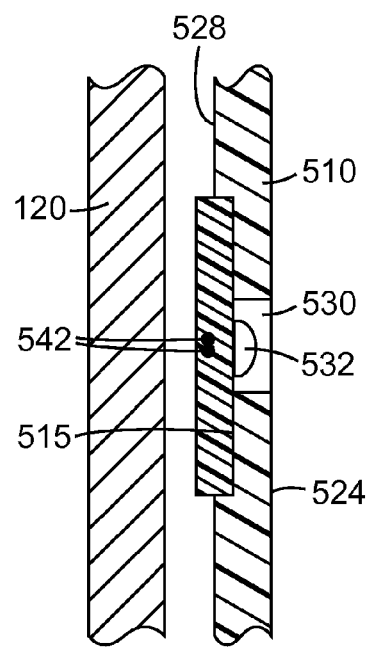
FIG. 6 is a cross-sectional view of a portion of a rail cap assembly according to the present disclosure showing an alternative configuration.

In some embodiments, for example, that shown in FIG. 6 wherein no double-sided pressure-sensitive adhesive tape is used, first sidewall 524 has groove 515 that is contiguous with inner surface 528 adjacent bedrail 120, see FIG. 6. Groove 515 may serve to lower the profile of some or all of the lighting system 535 (e.g., connective wiring 542 and lighting elements 532 dispose in openings 530, which may be particularly useful in case of an interference fit between the rail cap assembly and the bedrail.

Examples of lighting elements include incandescent bulbs, fluorescent bulbs, and light emitting diodes (LEDs). LEDs are a potentially desirable choice for the lighting elements, because of their compact size and generated light intensity. The LEDs may be packaged LEDs or non-packaged LEDs, for example, LED dies, surface-mounted LEDs, chip-on-board LEDs and LEDs of other configurations. If only a single color needs to be emitted from a lighting element, then only a single LED may be used; however, more than one LED of the same type may be used to augment the optical power emitted by the lighting element. Different LEDs may be used to produce the different colors where the color of light emitted from the light emitting element is selectable. Individual control of the different LEDs leads to the ability to control the color of the emitted light. In addition, if it is desired that the light emitting element emit white light, then the light emitting element may be provided with a number of LEDs emitting light of different colors, whose combined effect is to emit light perceived by a viewer to be white. Another approach to producing white light is to use one or more LEDs that emit light at a relatively short wavelength and to convert the emitted light to white light using a phosphor wavelength converter.

At least a portion of the lighting elements, typically all, are disposed within respective openings. Typically, the openings are less than about 4 centimeters (cm) (e.g., less than about 3 cm, less than about 2 cm, or even less than about 1 cm) in their maximum dimension, and are of suitable size that a maximum amount of illumination from the lighting elements is transmitted through the openings. More typically, the openings are sufficiently large to accommodate any light bulbs of the lighting elements, yet not substantially larger than the lighting elements in order that the possibility of trauma is minimized; however, this in not a requirement.

The lighting elements are electrically connected to one another, and optionally to the electrical switch by connective wiring. The connective wiring may have any suitable form such as, for example, twisted pair and multiconductor insulated cables (e.g., single conductor, two conductor, and three conductor insulated cables). Ribbon cables are one useful form of multiconductor insulated cables, especially ribbon cables that have a low thickness and are encased in a flexible tough plastic sheath. Loose wires may also be used.

The electrical switch may be, for example, an on/off switch or a dimmer switch. In some embodiments, the electrical switch may be a capacitance switch. In such cases, the electrical switch may be disposed, for example, in one of the openings or be located behind the rail cap if sufficient sensitivity can be achieved. In some embodiments, the electrical switch may be mounted externally on to one of the sidewalls, typically the sidewall having the lighting elements, although the opposite sidewall may also be used. In some embodiments each rail cap assembly has a separate electrical switch, while in some embodiments, only one rail cap (or neither rail cap assembly has an electrical switch).

If desired, the electrical switch may have dimmer and/or sequencing feature(s) such that the lighting elements may be illuminated according to a particular sequence.

Advantageously, at least some rail cap assemblies according to the present disclosure may be manufactured from existing rail caps by creating openings in the rail cap (e.g., by drilling or punching) and installing a prefabricated lighting system into the openings. One exemplary lighting system that can be used is available as PICKUP BED LIGHT KIT from 3M Company. The lighting system may be affixed to the rail cap by any suitable method, including, for example, glue, tape, interference fit, and/or mechanical fasteners.

Rail cap assemblies of the present disclosure are typically used in pairs, installed on respective bedrails (e.g., of a pickup truck), although this is not a requirement. As installed on or both of the rail cap assemblies may be wired to one or more power sources independently or as a combination. For each one rail cap assembly may be electrically connected to a second rail cap assembly and controlled through a single electrical switch on one of the rail cap assemblies.

Rail cap assemblies of the present disclosure may be used in combination with a variety of structures. Examples include, motor vehicles such as cars and trucks (especially pickup trucks), boats, utility trailers, and architectural railings (e.g., deck railings).

Objects and advantages of this disclosure are further illustrated by the following non-limiting examples, but the particular materials and amounts thereof recited in these examples, as well as other conditions and details, should not be construed to unduly limit this disclosure.

All patents and publications referred to herein are hereby incorporated by reference in their entirety. Various modifications and alterations of this disclosure may be made by those skilled in the art without departing from the scope and spirit of this disclosure, and it should be understood that this disclosure is not to be unduly limited to the illustrative embodiments set forth herein.

What is claimed is:

1. A pickup truck having bedrails adjacent a cargo bay, wherein each bedrail has a respective rail cap assembly secured thereon, wherein the rail cap assembly comprises:
   a rail cap having a first and second opposed ends separated by a length, wherein the rail cap has a top and a first sidewall that together form an inner surface extending from the first end to the second end, wherein a plurality of openings are spaced along the length of the first sidewall, wherein the rail cap further comprises a second sidewall adjacent the top, wherein a channel is formed by the first and second sidewalls and the top, and wherein the rail cap assembly fits over and down along a top portion of one of the bedrails; and
   a lighting system at least partially disposed adjacent the inner surface and comprising a plurality of lighting elements, wherein each of the plurality of lighting elements is secured within a respective opening of the plurality of openings, and wherein the plurality of lighting elements are electrically interconnected through connective wiring.

2. The pickup truck of claim 1, wherein the rail cap assembly further comprises an electrical switch, wherein the plurality of lighting elements is electrically connected through the connective wiring to the electrical switch, and wherein the electrical switch is adapted to regulate electrical power to the plurality of lighting elements.

3. The pickup truck of claim 2, wherein the pickup truck has a battery, and wherein the electrical switch is electrically connected to a positive terminal of the battery by a fused circuit.

4. The pickup truck of claim 1, further comprising double-sided pressure-sensitive adhesive tape disposed between the rail cap assembly and the bedrail.

5. The pickup truck of claim 1, wherein the rail cap further comprises a second sidewall adjacent the top, wherein a channel is formed by the first and second sidewalls and the top.

6. The pickup truck of claim 5, wherein the first sidewall has an extended portion that is disposed further from the top than the second sidewall.

7. The pickup truck of claim 1, wherein the first sidewall has at least one groove disposed therein and contiguous with the inner surface, wherein at least a portion of the connective wiring is disposed within the at least one groove.

8. A rail cap assembly comprising:
   a rail cap for fitting over and down along the top portion of a bedrail of a pickup truck, the rail cap having first and second opposed ends separated by a length, wherein the rail cap has a top and a first sidewall that together form an inner surface extending from the first end to the second end, and wherein a plurality of openings are spaced along the length of the first sidewall, wherein the rail cap further comprises a second sidewall adjacent the top, wherein a channel is formed by the first and second sidewalls and the top; and
   a lighting system at least partially disposed adjacent the inner surface and comprising a plurality of lighting elements, wherein each of the plurality of lighting elements is secured within a respective opening of the plurality of openings, and wherein the plurality of lighting elements are electrically interconnected through connective wiring.

9. The rail cap assembly of claim 8, further comprising an electrical switch, wherein the plurality of lighting elements is electrically connected through the connective wiring to the electrical switch, and wherein the electrical switch is adapted to regulate electrical power to the plurality of lighting elements.

10. The rail cap assembly of claim 9, wherein the electrical switch is disposed within one opening of the plurality of openings.

11. The rail cap assembly of claim 9, wherein the electrical switch comprises a capacitance switch.

12. The rail cap assembly of claim 8, wherein the plurality of lighting elements comprises light emitting diodes.

13. The rail cap assembly of claim 8, wherein the connective wiring comprises a ribbon cable.

14. The rail cap assembly of claim 8, wherein the rail cap is an integral body.

15. The rail cap assembly of claim 8, further comprising foam disposed adjacent the inner surface.

16. The rail cap assembly of claim 8, further comprising double-sided pressure-sensitive adhesive tape disposed adjacent the inner surface.

17. The rail cap assembly of claim 8, wherein the rail cap further comprises a second sidewall adjacent the top, wherein a channel is formed by the first and second sidewalls and the top.

18. The rail cap assembly of claim 8, wherein the first sidewall has an extended portion that is disposed further from the top than the second sidewall.

19. The rail cap assembly of claim 8, wherein the first sidewall has at least one groove disposed therein and contiguous with the inner surface, wherein at least a portion of the connective wiring is disposed within the at least one groove.

20. A method of using a rail cap assembly, the method comprising:
   disposing at least one rail cap assembly onto at least one respective bedrail of a pickup truck, wherein the rail cap assembly comprises:
   a rail cap for fitting over and down along the top portion of a bedrail of a pickup truck, the rail cap having first and second opposed ends separated by a length, wherein the rail cap has a top and a first sidewall that together form an inner surface extending from the first end to the second end, and wherein a plurality of openings are spaced along the length of the first sidewall, wherein the rail cap further comprises a second sidewall adjacent the top, wherein a channel is formed by the first and second sidewalls and the top; and
   a lighting system at least partially disposed adjacent the inner surface and comprising a plurality of lighting elements, wherein each of the plurality of lighting elements is secured within a respective opening of the plurality of openings, and wherein the plurality of lighting elements are electrically interconnected through connective wiring.

21. The method of claim 20, wherein the method comprises disposing two of the rail cap assemblies onto two respective bedrails of the pickup truck.

22. The method of claim 20, wherein the rail cap assembly further comprises an electrical switch, wherein the plurality of lighting elements is electrically connected through the connective wiring to the electrical switch, wherein the electrical switch is adapted to regulate electrical power to the plurality of lighting elements, and wherein the method further comprises:
   electrically connecting the electrical switch to the positive terminal of a motor vehicle battery by a fused circuit.

23. The method of claim 20, wherein the rail cap assembly further comprises an electrical switch, wherein the plurality of lighting elements is electrically connected through the connective wiring to the electrical switch, wherein the electrical switch is adapted to regulate electrical power to the plurality of lighting elements, and wherein the method further comprises:
   electrically connecting the electrical switch to a tail light harness of a motor vehicle.

* * * * *